United States Patent
Hughes et al.

(10) Patent No.: US 10,212,250 B2
(45) Date of Patent: Feb. 19, 2019

(54) HARDWARE ID BASED USER PROFILE IDENTIFICATION AND SHARING

(71) Applicant: Verizon Patent and Licensing Inc., Arlington, VA (US)

(72) Inventors: Kent W. Hughes, Oakland, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 278 days.

(21) Appl. No.: 14/280,104

(22) Filed: May 16, 2014

(65) Prior Publication Data
US 2015/0334169 A1    Nov. 19, 2015

(51) Int. Cl.
```
H04L 29/08      (2006.01)
H04W 4/12       (2009.01)
H04L 29/06      (2006.01)
H04W 12/08      (2009.01)
H04W 4/80       (2018.01)
H04L 29/12      (2006.01)
```

(52) U.S. Cl.
CPC ......... *H04L 67/306* (2013.01); *H04L 63/102* (2013.01); *H04L 67/10* (2013.01); *H04L 67/22* (2013.01); *H04L 67/28* (2013.01); *H04W 4/12* (2013.01); *H04W 4/80* (2018.02); *H04W 12/08* (2013.01); *H04L 61/6022* (2013.01)

(58) Field of Classification Search
CPC ... H04L 61/6022; H04L 67/306; H04L 67/28; H04L 67/22; H04L 67/10; H04W 4/12; H04W 4/008
See application file for complete search history.

(56) References Cited

U.S. PATENT DOCUMENTS

| | | | | |
|---|---|---|---|---|
| 9,226,224 | B1* | 12/2015 | Houri | H04W 48/16 |
| 2007/0015519 | A1* | 1/2007 | Casey | G01C 21/20 |
| | | | | 455/456.2 |
| 2011/0238517 | A1* | 9/2011 | Ramalingam | G06Q 20/10 |
| | | | | 705/26.1 |
| 2012/0130813 | A1* | 5/2012 | Hicken | G06Q 30/0255 |
| | | | | 705/14.54 |
| 2013/0110624 | A1* | 5/2013 | Mitrovic | G06Q 30/0261 |
| | | | | 705/14.53 |
| 2013/0198383 | A1* | 8/2013 | Tseng | H04L 63/102 |
| | | | | 709/225 |
| 2014/0241316 | A1* | 8/2014 | Okmyanskiy | H04W 36/0066 |
| | | | | 370/331 |
| 2014/0279014 | A1* | 9/2014 | Roka | G06Q 30/0261 |
| | | | | 705/14.58 |
| 2015/0142552 | A1* | 5/2015 | Schmehl | G06Q 30/0269 |
| | | | | 705/14.41 |
| 2015/0324810 | A1* | 11/2015 | Vincent | G06Q 30/0201 |
| | | | | 705/7.29 |

* cited by examiner

*Primary Examiner* — Shean Tokuta
*Assistant Examiner* — Juan C Turriate Gastulo

(57) ABSTRACT

A server device may receive, via a local wireless connection with a user device, a hardware identifier associated with the user device; transmit the hardware identifier to a profile server; receive, from the profile server, a user profile associated with the user of the user device; generate a message based on the user profile; and provide the message to the user device.

13 Claims, 8 Drawing Sheets

600 →

| Hardware ID Information | |
|---|---|
| MAC Address | 00:00:00:00:AA |
| Bluetooth MAC Address | 00:00:00:00:BB |
| IMSI | 45874258698412500 |
| IMEI | 4578132355887870 |

| User Profile ID: User 123 |
|---|
| Profile Location: /secure/profiles/profile_user123 |

| Permissions Information | |
|---|---|
| Information Type | Shared Parties |
| Personal Information | Merchant 1, Merchant 2, Merchant 3 |
| Web Browsing History | Merchant 1 |
| Shopping History | Merchant 2 |
| Payment Information | Merchant 3 |
| Location History | Merchant 2, Merchant 3 |
| Application User Interactions | Merchant 1, Merchant 3 |

Fig. 6

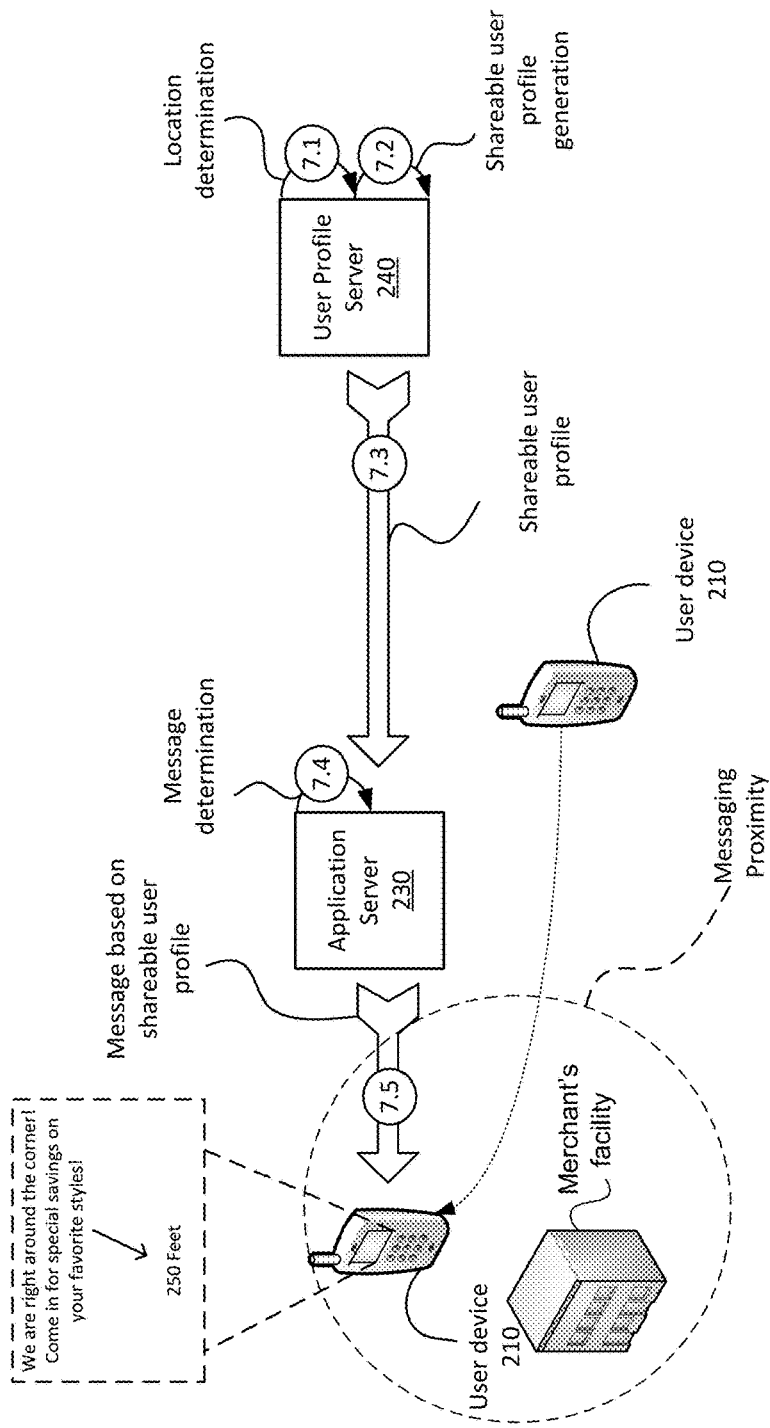

HARDWARE ID BASED USER PROFILE IDENTIFICATION AND SHARING

BACKGROUND

Merchants sometimes market products and/or services to prospective customers based on customer interests. Determining customer interests can be complex, inaccurate, and invasive.

BRIEF DESCRIPTION OF THE DRAWINGS

FIG. 6 illustrates an example data structure that may store permission information for a user of a user device;

FIG. 7 illustrates an example implementation for providing a shareable user profile to an applications server based on determining that a user device has entered a messaging proximity.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit a messaging system (e.g., associated with a merchant) to receive a user profile based on hardware information of a user device associated with the user profile. In some implementations, a network device, associated with the messaging system, may obtain the hardware information from wireless local area network (WLAN) connection signals transmitted by the user device (e.g., Wi-Fi connection signals). For example, the network device (which may be located at the merchant's facility) may obtain the hardware information when the user device enters a communication range of the network device (e.g., when the user device approaches the merchant's facility in which the network device is located). Once the network device obtains the hardware information, the user profile, associated with the hardware information, may be received by the messaging system, and the messaging system may provide a message to the user device based on information included in the user profile. For example, the messaging system may provide a message, such as an advertisement or promotion for the merchant, based on information in the user profile that identifies a user's interests (e.g., based on web browsing activity, shopping activity, and/or some other information identified in the user profile).

Figure 1:
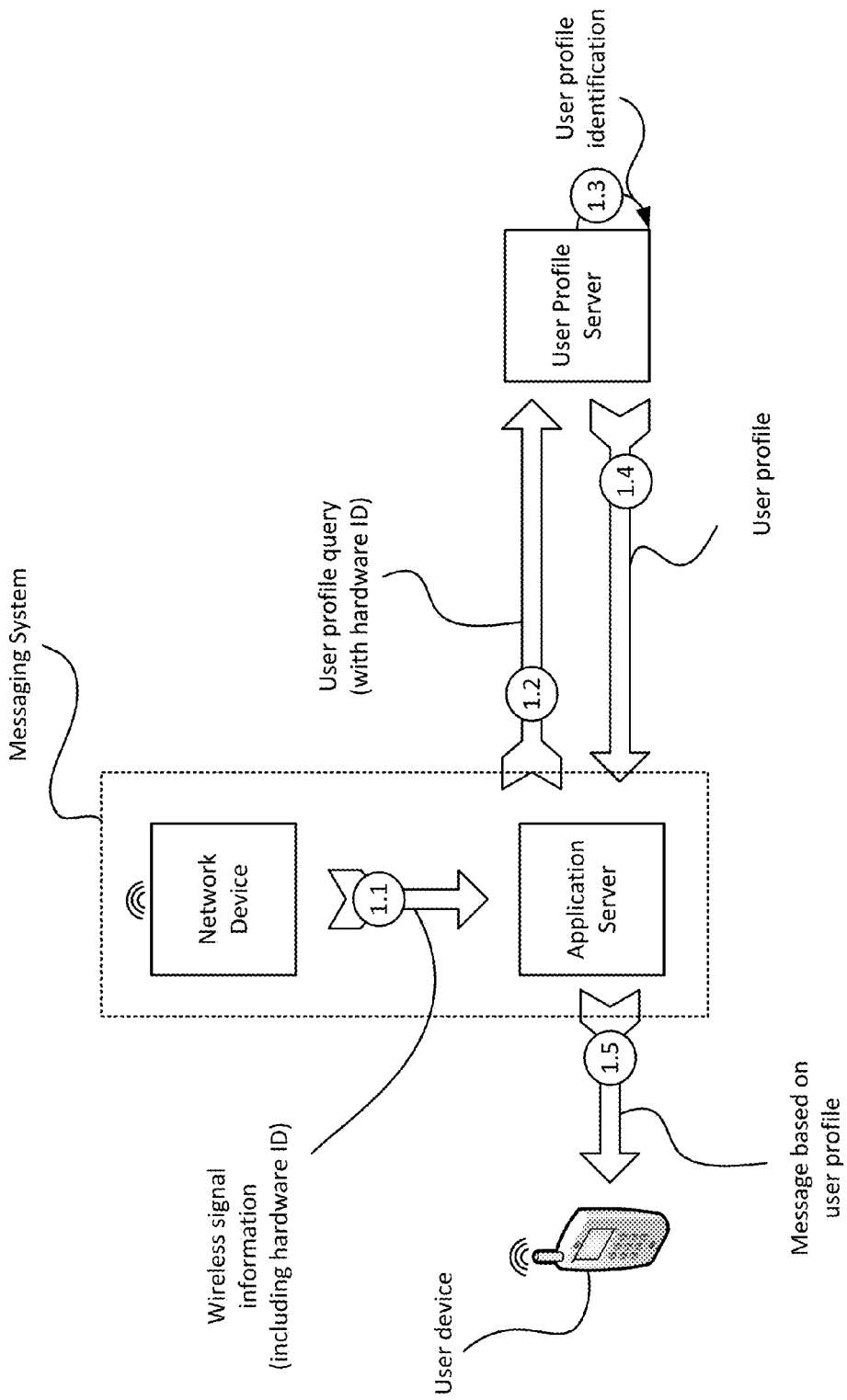
FIG. 1 illustrates an example overview of an implementation described herein.

FIG. 1 illustrates an example overview of an implementation described herein. In FIG. 1, a user profile server may maintain a user profile for a user of a user device. The user profile server may store information relating to the user (user information), information relating to the user device (hardware information), browsing activity associated with the user, location history of the user, information relating to user inputs received by the user device, information relating to the shopping history of the user (shopping history information), information relating to content received by the user device (content receiving history information), etc.

In FIG. 1, the user device may transmit wireless signals (e.g., WLAN connection signals, Wi-Fi signals, and/or some other type of wireless signal). A network device, associated with a messaging system of a merchant, may receive the wireless signals. For example, the network device may be located at the merchant's facility, and may receive the wireless signals when the user device is located within a communications range of the network device (and within a distance, corresponding to the communications range, of the merchant's facility). In some implementations, the wireless signals may include a broadcast frame that includes hardware information of the user device (e.g., a hardware identifier (ID)), such as a media access control (MAC) address and/or some other hardware information or identifier.

The network device may provide the hardware ID to an application server associated with the messaging system (arrow 1.1). The application server may provide a user profile query (including the hardware ID) to the user profile server (arrow 1.2). Bases on receiving the user profile query, the user profile server may identify a user profile corresponding to the hardware ID (arrow 1.3). The application server may receive the identified user profile (arrow 1.4), and may provide a message based on information included in the user profile (arrow 1.5). For example, the application server may provide a message based on the user's interests as determined by information included in the user profile. The message may be, for example, a message relating to products or sales currently offered by the merchant. As a result, the user device may receive the message when the user device travels to within a communications range of a network device located at the merchant's facility, and the received message may be based on the user's interests. As described in greater detail below, the application server may receive a "shareable" user profile that only includes information that the user has expressly permitted to share (e.g., using an "opt-in" process).

Figure 2:
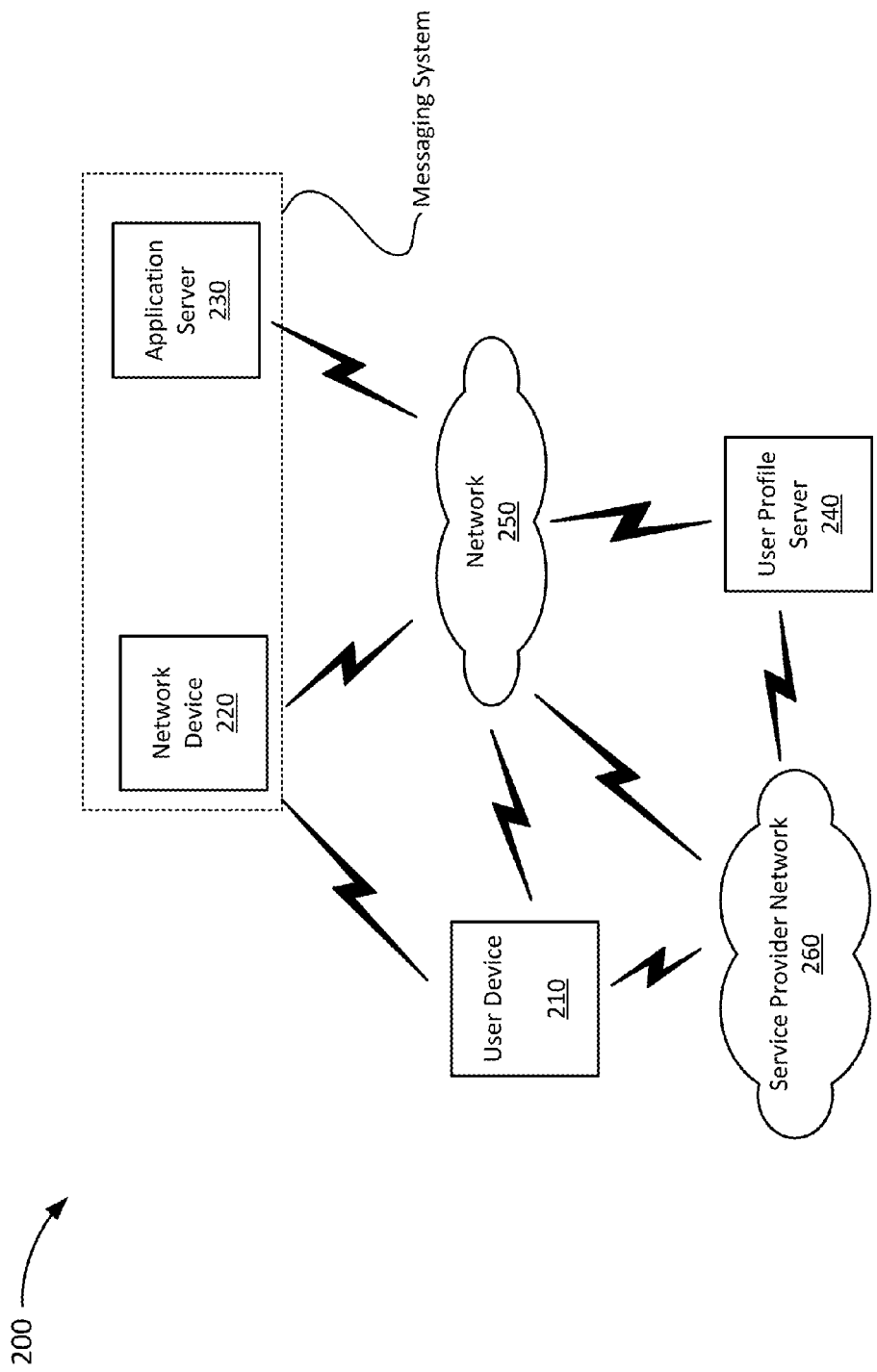
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, network device 220, application server 230, user profile server 240, network 250, and service provider network 260. Network device 220 and application server 230 may be part of a messaging system associated with a particular party.

User device 210 may include a device capable of communicating via a network, such as network 250 and/or service provider network 260. For example, user device 210 may correspond to a mobile communication device (e.g., a smart phone or a personal digital assistant (PDA)), a portable computer device (e.g., a laptop or a tablet computer), a gaming device, and/or some other type of computing device.

User device 210 may access service provider network 260 (e.g., a cellular network) in order to access content, services, and/or another network, such as network 250. For example, user device 210 may access service provider network 260 via a base station, evolved node B (eNB), and/or other type of network device. User device 210 may request access to service provider network 260 by providing registration information that may be used to authorize user device 210 to access service provider network 260. For example, user device 210 may provide a subscriber identity module (SIM) card identifier, an international mobile subscriber identifier (IMSI), and/or some other information that may be used to authorize user device 210 to access service provider network 260. User device 210 may transmit broadcast frames when a wireless network adapter of user device 210 is active. The broadcast frames may be associated with wireless connection signals (e.g., WLAN or WiFi connection signals), and may include a hardware ID of user device 210.

Network device 220 may include one or more routers, hubs, access points, gateways, and/or other network devices. In some implementations, network device 220 may be implemented in a facility associated with the messaging system. For example, network device 220 may be implemented in a merchant facility and/or some other facility. Network device 220 may determine a signal strength of received wireless connection signals transmitted by user device 210 (e.g., when user device 210 is within a communication range of network device 220 and within a corresponding distance of the facility in which network device 220 is implemented). Network device 220 may also determine a hardware ID of user device 210 (e.g., based on broadcast frames transmitted via the wireless connections signals). Network device 220 may output, to application server 230, information that identifies the hardware ID and the received signal strength (referred to herein as "wireless signal information"). Network device 220 may periodically output the wireless signal information as the signal strength varies (e.g., as interference varies and/or as the position of user device 210, relative to network device 220, changes). In some implementations, network device 220 may implement a WLAN for user device 210 to connect in order to access network 250. Network device 220 may output the wireless signal information whether or not user device 210 connects to the WLAN implemented by network device 220.

Application server 230 may include one or more computing devices, such as a server device or a collection of server devices. In some implementations, application server 230 may receive wireless signal information from network device 220, and may request a user profile based on a hardware ID identified by the wireless signal information. Application server 230 may receive the user profile, and determine a message to send to user device 210 based on information included in the user profile. For example, application server 230 may determine a message to send based on user interests identified in the user profile. Since the wireless signal information includes the hardware ID of user device 210, application server 230 may request the user profile when user device 210 is within communications range of network device 220 (and hence within the merchant facility).

In some implementations, application server 230 may receive the user profile without explicitly requesting the user profile (e.g., when user profile server 240 determines that user device 210 is within a threshold distance of a merchant facility associated with application server 230). In some implementations, application server 230 may provide registration information to register a location (e.g., the location of a merchant facility) for which application server 230 should receive a user profile when user device 210 is located within a threshold distance of the location.

User profile server 240 may include one or more computing devices, such as a server device or a collection of server devices. In some implementations, user profile server 240 may store activity associated with user device 210. For example, user profile server 240 may store browsing activity, application activity (e.g., user interactions with an application running on user device 210), and/or general user interactions with user device 210. The activity of user device 210 may be stored in a user profile, and may indicate user interests (e.g., interests in a particular subject, product, etc.). In some implementations, the user profile may be associated with a user and/or one or more hardware IDs of user device 210.

User profile server 240 may store user device activity when user device 210 communicates via network 250 and/or service provider network 260. User profile server 240 may store permissions information that identifies types of information that a user is willing to share, and parties to which the information may be shared. User profile server 240 may provide a "shareable" user profile to application server 230 that includes information that the user has expressly permitted to share. In some implementations, user profile server 240 may provide the shareable user profile based on receiving a request for the user profile from application server 230. Additionally, or alternatively, user profile server 240 may provide the shareable user profile when user device 210 is located within a threshold distance of a facility associated with application server 230.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Service provider network 260 may include a cellular network and/or some other type of network. In some implementations, service provider network 260 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations, such as eNodeBs (eNBs), via which user device 210 communicates with the EPC.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
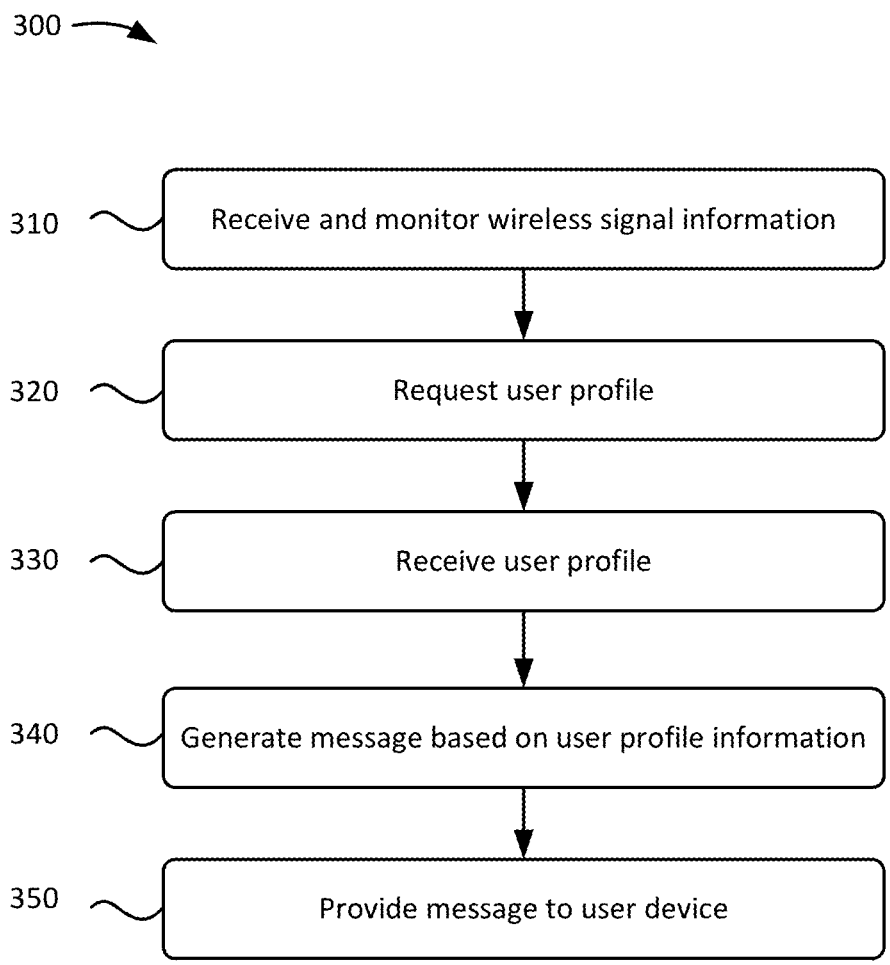
FIG. 3 illustrates a flowchart of an example process for obtaining a user profile based on wireless signal information and providing a message based on information included in the user profile.

FIG. 3 illustrates a flowchart of an example process 300 for obtaining a user profile based on wireless signal information and providing a message based on information included in the user profile. In some implementations, process 300 may be performed by application server 230. In some implementations, some or all of process 300 may be performed by one or more other devices.

As shown in FIG. 3 process 300 may include receiving and monitoring wireless signal information (block 310). For example, application server 230 may receive wireless signal information from network device 220 (e.g., when user device 210 travels to a communication range of network device 220 which may correspond to a particular distance of a merchant's facility in which network device 220 is located). The wireless signal information may include a hardware ID of user device 210 and/or a signal strength value that indicates the signal strength of a wireless signal received by network device 220 and transmitted by user device 210. Application server 230 may periodically receive the wireless signal information, and monitor the wireless signal information for user device 210. Based on monitoring the wireless signal information, application server 230 may determine a position of user device 210 relative to network device 220, and may determine that user device 210 is moving towards network device 220 (e.g., as the signal strength values increase). In some implementations, application server 230 may determine the position of user device 210 based on triangulation information received from multiple network devices 220.

Process 300 may also include requesting a user profile (block 320). For example, application server 230 may request a user profile from user profile server 240. The request may include the hardware ID received as part of the wireless signal information. The request may also include authentication information to authenticate application server 230 and authorize application server 230 to receive the user profile.

In some implementations, application server 230 may request the user profile when the signal strength value satisfies a particular threshold (e.g., indicating that user device 210 is located within a threshold distance of network device 220). Additionally, or alternatively, application server 230 may request the user profile when the rate of increase of the signal strength value satisfies a particular threshold (e.g., indicating that user device 210 is approaching network device 220). Additionally, or alternatively, application server 230 may request the user profile when the signal strength value satisfies a particular threshold for a particular amount of time. In some implementations, application server 230 may request the user profile regardless of the signal strength values, and may request the user profile when a hardware ID of user device 210 is received as part of the wireless signal information.

Process 300 may further include receiving the user profile (block 330). For example, application server 230 may receive the user profile from user profile server 240 based on providing the request for the user profile. In some implementations, application server 230 may receive the user profile from user profile server 240 without requesting the user profile. For example, application server 230 may receive the user profile when user profile server 240 determines that user device 210 has traveled to a threshold distance of a facility associated with a messaging system (e.g., a location that application server 230 has registered with user profile server 240).

Process 300 may also include generating a message based on the user profile information (block 340). For example, application server 230 may generate a message to send to user device 210 based on information included in the user profile. In some implementations, application server 230 may analyze the information in the user profile to determine the user's interests based on browsing history, application activity, content receiving activity, shopping history, social networking activity, and/or some other information that may indicate the user's interests. Application server 230 may determine that the user is interested in a particular product sold by a merchant associated with the messaging system, and may generate a message including information regarding the product (e.g., an advertisement or promotion for the product). In some implementations, the message may be based on a location of user device 210 (e.g., a "fine" location), and may include information regarding a product based on the location of user device 210 (e.g., a product in a particular aisle of the merchant's facility in which user device 210 is located). In some implementations, application server 230 may generate a message that identifies a location of the merchant's facility to inform a user of user device 210 of the location of the merchant's facility.

Process 300 may further include providing the message to the user device (block 350). For example, application server 230 may provide the message to user device 210 based on contact information included in the user profile. In some implementations, application server 230 may provide the message via a telephone number, an e-mail address, etc. Application server 230 may provide the message in the form of a short message service (SMS) message, a multimedia service (MMS) message, an e-mail message, a text message, a video message, etc. As a result, the user of user device 210 may receive the message when the user travels with user device 210 to within a threshold distance of the merchant's facility or approaches the merchant's facility (e.g., as determined by wireless signal information received by network device 220). Further, the user device may receive a message that is based on the user's interests, and based on information that the user has expressly permitted to share.

Figure 4:
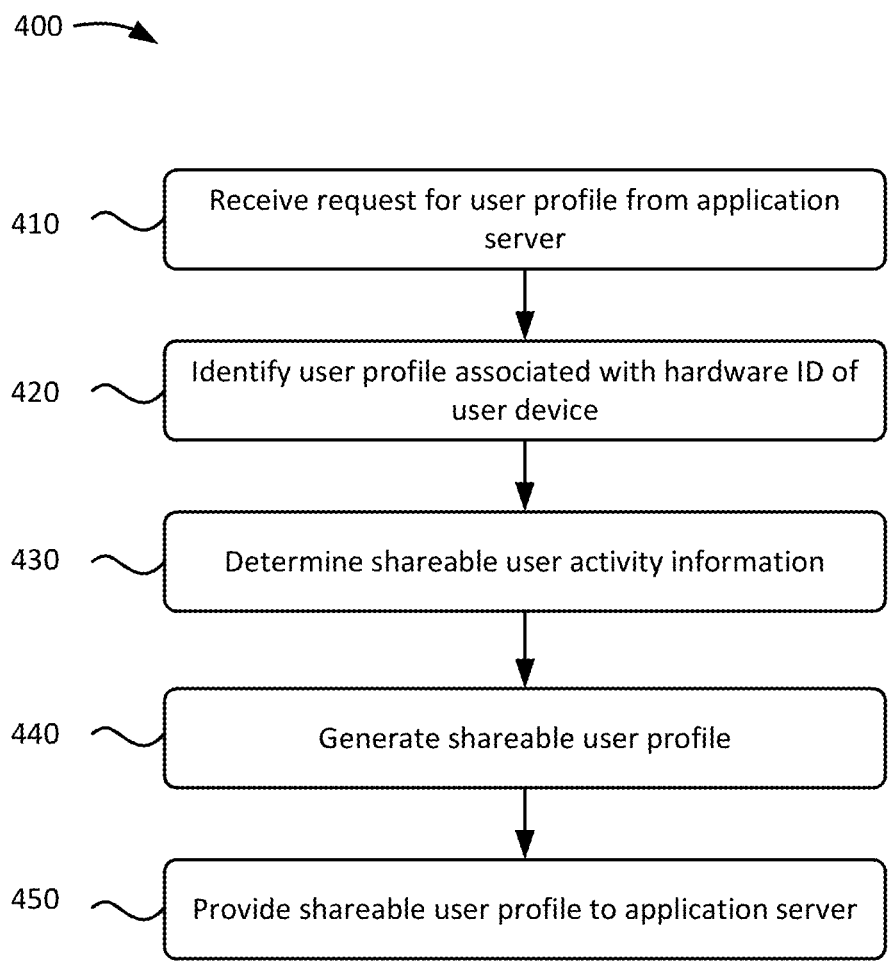
FIG. 4 illustrates a flowchart of an example process for providing a sharable user profile to an application server based on receiving a request for the sharable user profile.

FIG. 4 illustrates a flowchart of an example process 400 for providing a sharable user profile to an application server based on receiving a request for the sharable user profile. In some implementations, process 400 may be performed by user profile server 240. In some implementations, some or all of blocks of process 400 may be performed by one or more other devices.

As shown in FIG. 4, process 400 may include receiving a request for a user profile from an application server (block 410). For example, user profile server 240 may receive the request for the user profile from application server 230 (e.g., when application server 230 receives wireless signal information from network device 220 identifying that user device 210 is within a communications range of network device 220). As described above, the request may include a hardware ID of user device 210.

Process 400 may also include identifying a user profile associated with the hardware ID of the user device (block 420). For example, user profile server 240 may identify a user profile associated with the hardware ID of user device 210 (e.g., a hardware ID included in the request for the user profile). As described above, user profile server 240 may store information associating a user profile with the hardware ID, and may identify the user profile associated with the hardware ID. In some implementations, user profile server 240 may translate a first hardware ID (e.g., a MAC address) into a second hardware ID (e.g., an IMSI, a SIM card number, and/or some other hardware ID), and identify a user profile associated with the second hardware ID. In some implementations, user profile server 240 may translate the hardware ID into a generated value using a number generator, and may store information associating the user profile with the generated number.

Process 400 may further include determining sharable user activity information (block 430). For example, user profile server 240 may determine user activity information in the user profile that is considered to be "sharable" with application server 230. In some implementations, user profile server 240 may store permissions information that identifies types of information that may be shareable with different messaging systems (e.g., different parties, different merchants, etc.). For example, user profile server 240 may store information that identifies that a first type of information (e.g., personal information, such as a user's name and address) may be shareable with a messaging system associated with a first merchant, whereas a second type of information (e.g., shopping history) may be sharable with a messaging system associated with a second merchant. An example of a data structure shat stores permissions information is described below with respect to FIG. 6.

Process 400 may also include generating a shareable user profile (block 440), and providing the sharable user profile to the application server (block 450). For example, user profile server 240 may generate the shareable user profile that includes information that the user has selected to share with the particular messaging system (e.g., "sharable" information). User profile server 240 may generate a document that includes the shareable information but does not include any non-sharable information. Once the sharable user profile has been generated, user profile server 240 may provide the sharable user profile to application server 230. Application server 230 may then send, based on information included in the sharable user profile, a message to user device 210.

Figure 5:
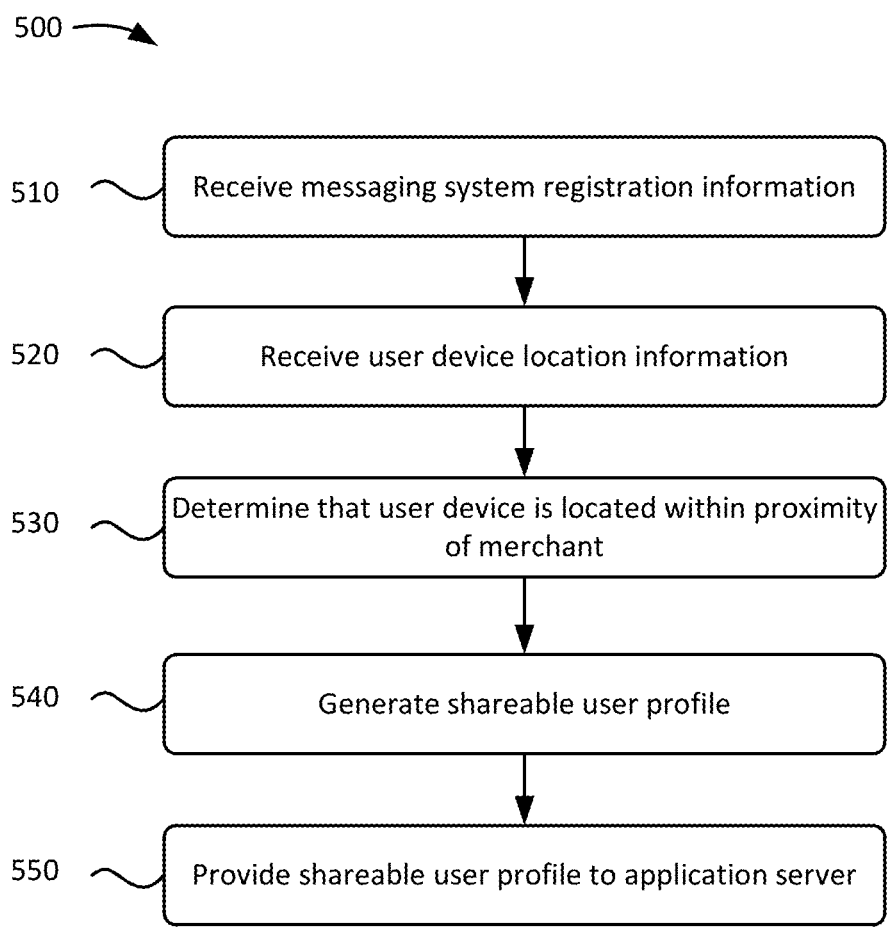
FIG. 5 illustrates a flowchart of an example process for providing a sharable user profile to an application server based on determining that a user device is located within messaging proximity.

FIG. 5 illustrates a flowchart of an example process 500 for providing a sharable user profile to an application server based on determining that a user device is located within messaging proximity. In some implementations, process 500 may be performed by user profile server 240. In some implementations, some or all of blocks of process 500 may be performed by one or more other devices.

As shown in FIG. 5, process 500 may include receiving messaging system registration information (block 510). For example, user profile server 240 may receive messaging system registration information from application server 230. The messaging system registration information may include information regarding the messaging system (e.g., a merchant or party associated with the messaging system). In some implementations, the messaging system registration information may include information identifying a proximity in which a message should be delivered to user device 210.

Process 500 may further include receiving user device location information (block 520). For example, user profile server 240 may periodically receive or monitor the location of user device 210 (e.g., via a global position system (GPS) device of user device 210, cellular triangulation techniques, and/or via some other technique). In some implementations, user device 210 may share its location based on receiving an instruction from a user of user device 210 to share the location of user device 210. User profile server 240 may receive and/or monitor the location of user device 210 when user device 210 communicates via service provider network 260.

Process 500 may also include determining that the user device is located within the proximity of the merchant (block 530). For example, user profile server 240 may determine that user device 210 is located within the proximity of the merchant based on the location of user device 210 and the registration information identifying a registered messaging proximity.

Process 500 may further include generating a sharable user profile (block 540) and providing the sharable user profile to the application server (block 550). For example, user profile server 240 may generate a shareable user profile based on determining that user device 210 is located within the proximity of the merchant. When generating the shareable user profile, user profile server 240 may identify a user profile of user profile server 240 based on a hardware ID of user device 210 (e.g., a MAC address, an IMSI, a SIM card number, an IMEI, etc.), and may determine sharable information in the identified user profile based on permissions information that identifies types of information that may be shared with different messaging systems (e.g., different parties, different merchants, etc.). For example, as described above with respect to blocks 440 and 450, user profile server 240 may generate the shareable user profile that includes information that the user has selected to share with the particular messaging system (e.g., "sharable" information). User profile server 240 may generate a document that identifies the shareable information, and does not include non-sharable information. Once the sharable user profile has been generated, user profile server 240 may provide the sharable user profile to application server 230.

FIG. 6 illustrates an example data structure 600 that may store permissions information for a user of a user device. In some implementations, data structure 600 may be stored in a memory of user profile server 240. In some implementations, data structure 600 may be stored in a memory separate from, but accessible by, user profile server 240 (e.g., a "cloud" storage device). In some implementations, data structure 600 may be stored by some other device in environment 200, such as user device 210, network device 220, and/or application server 230.

As shown in FIG. 6, data structure 600 may store hardware ID information for user device 210. For example, data structure 600 may store a MAC address, a Bluetooth MAC address, an IMSI, an IMEI, and/or some other hardware ID information associated with user device 210. Data structure 600 may also store information identifying a user profile based on the hardware ID information. For example, data structure 600 may store an ID of the user profile, a link to the user profile, and/or some other information regarding the user profile. Data structure 600 may further store permissions information regarding a user of user device 210. The permissions information may identify types of information that may be shared with different messaging systems (e.g., different merchants and/or parties). For example, data structure 600 may identify types of information, such as basic personal information (e.g., name, address), payment information (e.g., credit card and/or other payment information), shopping history information, user device user input information, application user interaction information, location history information, and/or some other type of information.

As an example shown in FIG. 6, data structure 600 may store permissions information identifying that the user's personal information may be shared with particular merchants (e.g., merchant 1, merchant 2, and merchant 3). Similarly, the user's web browsing history may be shared with only merchant 1, the user's hipping history may be shared only with merchant 2, and the user's payment history may only be shared with merchant 3. The user's location history may be shared with merchant 2 and merchant 3, and the user's interactions with applications may be shared with merchant 1 and merchant 3.

Based on information stored by data structure 600, user profile server 240 may identify a user profile corresponding to a hardware ID included in wireless signal information received by application server 230. Further, based on information stored by data structure 600, user profile server 240 may generate a shareable user profile in accordance with the permissions.

Information stored by data structure 600 may be received by user device 210, and may be received based on an "opt-in" process. For example, by default, the permissions information for user device 210 may indicate that no information may be shared with any messaging systems or parties until the user of user device 210 has expressly provided permissions information that indicates that certain types of information may be shared with selected messaging systems.

While particular fields are shown in a particular format in data structure 600, in practice, data structure 600 may include additional fields, fewer fields, different fields, or differently arranged fields than are shown in FIG. 6. Also, FIG. 6 illustrates examples of information stored by data structure 600. In practice, other examples of information stored by data structure 600 are possible.

FIG. 7 illustrates an example implementation for providing a shareable user profile to an applications server based on determining that a user device has entered a proximity within a merchant. As shown in FIG. 7, user device 210 may enter the proximity (e.g., a "messaging proximity" corresponding to a threshold distance of a merchant's facility). User profile server 240 may determine that the location of user device 210 is within the proximity (arrow 7.1). User profile server 240 may identify a user profile of user device 210 (e.g., based on a hardware ID of user device 210), and generate a shareable user profile based on permissions information (arrow 7.2).

User profile server 240 may provide the shareable user profile to user profile server 240 (arrow 7.3), and application server 230 may determine a message to send to user device 210 based on the information in the shareable user profile. For example, assume that the shareable user profile includes the user's shopping history and location. Given this assumption, application server 230 may generate a message relating to the user's shopping history, and a location of the merchant that may sell merchandise relating to the user's shopping history. Application server 230 may provide the message to user device 210 (arrow 7.5), and user device 210 may display the message. As shown in FIG. 7, the message may notify the user of the merchant's location, and inform the user of products being sold by the merchant. In some implementations, the message may include promotions (e.g., advertisements, coupons, etc.) associated with the merchant.

While a particular example is shown in FIG. 7, the above description is merely an example implementation. In practice, other examples are possible from what is described above in FIG. 7.

Figure 8:
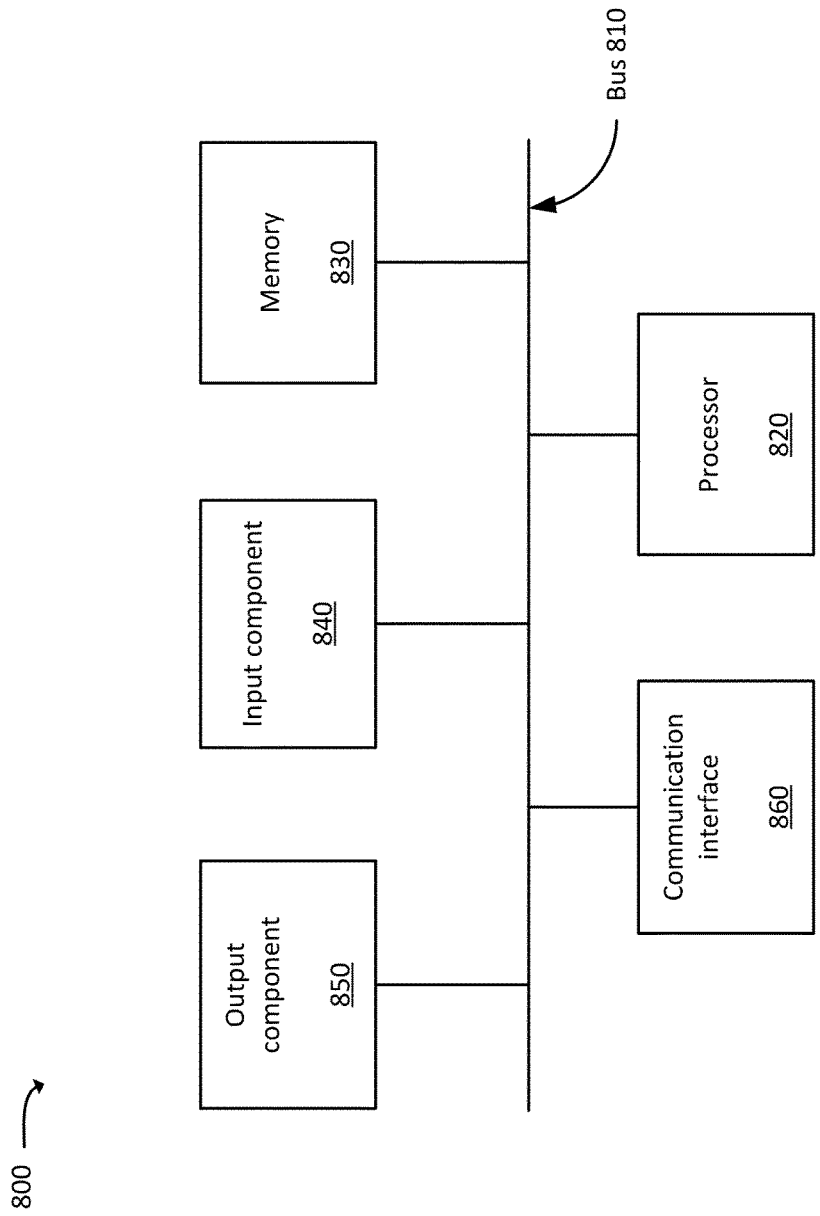
FIG. 8 illustrates example components of one or more devices, according to one or more implementations described herein.

FIG. 8 is a diagram of example components of device 800. One or more of the devices described above (e.g., with respect to FIGS. 1, 2, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3-5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and 7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar t as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the ten "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving, by one or more devices associated with a particular merchant and as part of providing a network connection to a user device via a local wireless connection with the user device, a first hardware identifier of the user device, the first hardware identifier including a media access control (MAC) address;
    determining signal strengths associated with the local wireless connection with the user device;
    determining, based on the signal strengths, a rate of change of the determined signal strengths;
    determining, based on an increasing rate of change of the determined signal strengths, when the user device is approaching the one or more devices associated with the particular merchant, wherein the determination of when the user device is approaching the one or more devices is further based on determining whether the rate of change satisfies a threshold;
    requesting, by the one or more devices and in response to the determination that the user device is approaching the one or more devices associated with the particular merchant, from a profile server, a set of types of information that have been authorized, by a user of the user device, as being shareable with the particular merchant, the requesting including providing the first hardware identifier and identification information of the particular merchant to the profile server, wherein the profile server:
        stores user profiles associated with a plurality of users, each of the user profiles including a plurality of types of information, wherein each of the plurality of types of information, included in a particular user profile associated with the user, have been designated by the user, on a per-type of information basis, as being shareable or not shareable with a user-selected set of merchants, of a plurality of merchants,
        identifies, based on the first hardware identifier, a second hardware identifier, the second hardware identifier including an International Mobile Subscriber Identity (IMSI) or Subscriber Identity Module (SIM) value,
        uses the second hardware identifier to identify the particular user profile associated with the user of the user device,
        identifies the plurality of types of information, indicated in the particular user profile, as being shareable with the particular merchant, and
        responds to the request by indicating the identified plurality of types of information as the requested set of types of information that have been designated by the user as being shareable with the particular merchant;
    receiving, by the one or more devices, from the profile server, and based on the request for the set of types of information that have been authorized by the user as being shareable with the particular merchant, the set of types of information that were previously designated, by the user, as being shareable with the particular merchant;
    generating, by the one or more devices, a message based on the set of types of information that have been authorized by the user as being shareable with the particular merchant, the generated message not including types of information that have not been authorized by the user as being shareable with the particular merchant; and
    providing, by the one or more devices, the message to the user device.

2. The method of claim 1, wherein the profile information includes at least one of:
    information relating to personal data of the user;
    payment information;
    location history information;
    shopping history information;

web browsing history information; or
user device user interaction information.

3. The method of claim 1, further comprising:
receiving location information of the user device,
wherein the message is further based on the location information of the user device.

4. A system comprising:
a server device associated with a particular merchant, the server device comprising:
   a non-transitory memory device storing a plurality of processor-executable instructions; and
   a processor configured to execute the processor-executable instructions, wherein executing the processor-executable instructions causes the processor to:
      receive, as part of providing a network connection to a user device via a local wireless connection with the user device, a first hardware identifier of the user device, the first hardware identifier including a media access control (MAC) address;
      determine signal strengths associated with the local wireless connection with the user device;
      determine, based on the signal strengths, a rate of change of the determined signal strengths;
      determine, based on an increasing rate of change of the determined signal strengths, when the user device is approaching the one or more devices associated with the merchant, wherein the determination of when the user device is approaching the one or more devices is further based on determining whether the rate of change satisfies a threshold;
      request, in response to the determination that the user device is approaching the one or more devices associated with the particular merchant, from a profile server, a set of types of information that have been authorized, by a user of the user device, as being shareable with the particular merchant, the requesting including identification information of the particular merchant and the first hardware identifier, wherein the profile server:
         stores user profiles associated with a plurality of users, each of the user profiles including a plurality of types of information, wherein each of the plurality of types of information, included in a particular user profile associated with the user, have been designated by the user, on a per-type of information basis, as being shareable or not shareable with a user-selected set of merchants, of a plurality of merchants,
         identifies, based on the first hardware identifier, a second hardware identifier, the second hardware identifier including an International Mobile Subscriber Identity (IMSI) or Subscriber Identity Module (SIM) card value,
         uses the second hardware identifier to identify the particular user profile associated with the user of the user device,
         identifies the plurality of types of information, indicated in the particular user profile, as being shareable with the particular merchant, and
         responds to the request by indicating the identified plurality of types of information as the requested set of types of information that have been designated by the user as being shareable with the particular merchant;
      receive, from the profile server and based on the request for the set of types of information that have been authorized by the user as being shareable with the particular merchant, the set of types of information that were previously designated, by the user, as being shareable with the particular merchant,
      generate a message based on the set of types of information that have been authorized by the user as being shareable with the particular merchant, the generated message not including types of information that have not been authorized by the user as being shareable with the particular merchant; and
      provide the message to the user device.

5. The system of claim 4, wherein the profile information includes at least one of:
information relating to personal data of the user;
payment information;
location history information;
shopping history information;
web browsing history information; or
user device user interaction information.

6. The system of claim 4, wherein executing the processor-executable instructions further causes the processor to:
receiving location information of the user device,
wherein the message is further based on the location information of the user device.

7. The method of claim 1, wherein the message includes an advertisement associated with the particular merchant.

8. The system of claim 4, wherein the message includes an advertisement associated with the particular merchant.

9. A non-transitory computer-readable medium including processor-executable instructions, that when executed by one or more processors of one or more devices associated with a particular merchant, causes the one or more processors to:
   receive, as part of providing a network connection to a user device via a local wireless connection with the user device, a first hardware identifier of the user device, the first hardware identifier including a media access control (MAC) address received from a broadcast frame via a wireless signal from the user device;
   determine signal strengths associated with the local wireless connection with the user device;
   determine, based on the signal strengths, a rate of change of the determined signal strengths;
   determine, based on an increasing rate of change of the determined signal strengths, when the user device is approaching one or more devices associated with the particular merchant, wherein the determination of when the user device is approaching the one or more devices is further based on determining whether the rate of change satisfies a threshold;
   request, in response to the determination that the user device is approaching the one or more devices associated with the particular merchant, from a profile server, a set of types of information that have been authorized, by a user of the user device, as being shareable with the particular merchant, the requesting including providing identification information of the merchant and the first hardware identifier, wherein the profile server:
      stores user profiles associated with a plurality of users, each of the user profiles including a plurality of types of information, wherein each of the plurality of types of information, included in a particular user profile associated with the user, have been designated by the user, on a per-type of information basis, as being shareable or not shareable with a user-selected set of merchants, of the plurality of merchants, identifies, based on the first hardware identifier, a second hardware identifier, the second hardware identifier including an International Mobile Subscriber Identity (IMSI) or Subscriber Identity Module (SIM) value, uses the second hardware identifier to identify the particular user profile associated with the user of the user device, identifies the plurality of types of information, indicated in the particular user profile, as being shareable with the particular merchant, and responds to the request by indicating the identified plurality of types of information as the requested set of types of information that have been designated by the user as being shareable with the particular merchant;

receive, from the profile server and based on the request for the set of types of information that have been authorized by the user as being shareable with the particular merchant, the set of types of information that were previously designated, by the user, as being shareable with the particular merchant;

generate a message based on the set of types of information that have been authorized by the user as being shareable with the particular merchant, the generated message not including types of information that have not been authorized by the user as being shareable with the particular merchant; and provide the message to the user device.

10. The non-transitory computer-readable medium of claim 9, wherein the profile information includes at least one of:

information relating to personal data of the user;
payment information;
location history information;
shopping history information;
web browsing history information; or
user device user interaction information.

11. The non-transitory computer-readable medium of claim 9, wherein executing the processor-executable instructions further causes the processor to:

receiving location information of the user device,
wherein the message is further based on the location information of the user device.

12. The method of claim 1, wherein the MAC address is received from a broadcast frame via a wireless signal from the user device.

13. The system of claim 4, wherein the MAC address is received from a broadcast frame via a wireless signal from the user device.

* * * * *